United States Patent
Kaida et al.

(10) Patent No.: US 7,442,418 B2
(45) Date of Patent: Oct. 28, 2008

(54) POLYMERIZABLE LIQUID CRYSTAL COMPOUND, LIQUID CRYSTAL COMPOSITION, OPTICAL ANISOTROPIC MATERIAL AND OPTICAL ELEMENT

(75) Inventors: Yuriko Kaida, Koriyama (JP);
Hiromichi Nagayama, Koriyama (JP);
Hiroshi Kumai, Koriyama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/616,158

(22) Filed: Dec. 26, 2006

(65) Prior Publication Data
US 2007/0104894 A1    May 10, 2007

Related U.S. Application Data

(63) Continuation of application No. PCT/JP2005/001839, filed on Feb. 8, 2005.

(30) Foreign Application Priority Data

Jun. 23, 2004  (JP) ............... 2004-185090
Jun. 25, 2004  (JP) ............... 2004-187788
Jun. 25, 2004  (JP) ............... 2004-187795

(51) Int. Cl.
C09K 19/38    (2006.01)
C09K 19/30    (2006.01)
C09K 19/20    (2006.01)
C07C 69/76    (2006.01)

(52) U.S. Cl. ............... 428/1.1; 252/299.63; 252/299.66; 252/299.67; 560/8; 560/55; 560/59; 560/61; 560/64; 560/76; 560/84; 560/102

(58) Field of Classification Search ............... 428/1.1, 428/1.3, 1.31; 252/299.01, 299.63, 299.66, 252/299.67; 560/8, 55, 59, 61, 64, 76, 84, 560/102
See application file for complete search history.

(56) References Cited

U.S. PATENT DOCUMENTS 5,750,051 A * 5/1998 Goulding et al. ....... 252/299.65
6,183,822 B1 * 2/2001 Farrand et al. ................ 428/1.1
6,824,709 B2 * 11/2004 Shundo .................. 252/299.62
7,371,438 B2 * 5/2008 Kaida et al. .................... 428/1.1
2003/0203128 A1 * 10/2003 Shundo ....................... 428/1.1

FOREIGN PATENT DOCUMENTS

| EP | 0 972 818 | 1/2000 |
|---|---|---|
| JP | 10-195138 | 7/1998 |
| JP | 2003-193055 | 7/2003 |
| JP | 2003-213265 | 7/2003 |
| JP | 2003-238491 | 8/2003 |
| JP | 2003-238492 | 8/2003 |
| WO | WO 02/053609 | 7/2002 |

OTHER PUBLICATIONS

U.S. Appl. No. 11/616,126, filed Dec. 26, 2006, Kaida et al.
U.S. Appl. No. 12/104,998, filed Apr. 17, 2008, Nagayama et al.

* cited by examiner

*Primary Examiner*—Shean C Wu
(74) *Attorney, Agent, or Firm*—Oblon, Spivak, McClelland, Maier & Neustadt, P.C.

(57) ABSTRACT

The present compound represented by formula(I)

$$CH_2=CR^1-COO-(L)_k-E^1-E^2-E^3-(E^4)_m-(E^5)_n-R^2 \quad (1)$$

provided that the symbols in the formula have the following meanings:

$R^1$: a hydrogen atom or a methyl group;
$R^2$: a $C_{1-8}$ alkyl group;
L: $-(CH_2)_pO-$, $-(CH_2)_q-$, -Cy-COO— (Cy is a trans-1,4-cyclohexylene group), -Cy-OCO—, $-E^6-(CH_2)_2-$, $-E^7-CH_2O-$ or $-E^8-O-$ (wherein each of p and q which are independent of each other, is an integer of from 2 to 8);
$E^1$, $E^2$, $E^3$ $E^4$, $E^5$, $E^6$, $E^7$, $E^8$: each independently a 1,4-pheneylene group or a trans-1,4-cyclohexylene group (provided that at least one of $E^1$, $E^2$ and $E^3$ is a trans-1,4-cyclohexylene group, and in a case where L is -Cy-OCO—, $E^1$ is a trans-1,4-cyclohexylene group),and
k, m, n: each independently 0 or 1, provided that when k is 1 and L is -Cy-COO—, -Cy-OCO—, $-E^6-(CH_2)_2-$, $-E^7-CH_2O-$ or $-E^8-O-$, at least one of m and n is 0.

The present compound is useful for liquid crystal composition and optical element.

13 Claims, No Drawings

POLYMERIZABLE LIQUID CRYSTAL COMPOUND, LIQUID CRYSTAL COMPOSITION, OPTICAL ANISOTROPIC MATERIAL AND OPTICAL ELEMENT

TECHNICAL FIELD

The present invention relates to a novel compound, a liquid crystal composition containing the compound, an optical anisotropic material obtained by polymerizing the liquid crystal composition, and an optical element.

BACKGROUND ART

In recent years, in order to increase the capacity of an optical disk, blue shift of laser light to be employed for writing and reading of information is in progress. At present, laser light having a wavelength of 780 nm is used for CDs, and that of 660 nm is used for DVDs, but it has been studied to use laser light having a wavelength of from 300 to 450 nm for optical recording media of the next generation. Accordingly, an optical element such as a diffraction element or a phase plate to modulate laser light having a wavelength of from 300 to 450 nm (hereinafter referred to also as blue laser light), is required, and therefore, an optical anisotropic material useful for laser light in such a wavelength range is needed.

On the other hand, liquid crystal molecules having polymerizable functional groups have both characteristics as a polymerizable monomer and characteristics as a liquid crystal. Accordingly, if the polymerization reaction is carried out after liquid crystal molecules having polymerizable functional groups are aligned, it is possible to obtain an optical anisotropic material having alignment of the liquid crystal molecules fixed. The optical anisotropic material has an optical anisotropy such as a refractive index anisotropy derived from a mesogen skeleton and is applied to e.g. a diffraction element or a phase plate by the use of such a characteristic.

As such an optical anisotropic material, for example, a polymer liquid crystal has been reported which is obtained by polymerizing a liquid crystal composition containing a compound represented by the following formula (2):

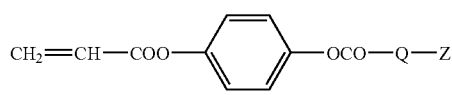

(2)

(wherein Q is a 1,4-phenylene group or a trans-1,4-cyclohexylene group, and Z is an alkyl group) (see JP-A-10-195138).

Further, the following properties may be mentioned as properties usually required for an optical anisotropic material for a diffraction element or a phase plate.

(1) Absorption of light is low.
(2) The in-plane optical properties (such as the retardation value) are uniform.
(3) The optical properties can easily be adjusted to those of other materials constituting the element.
(4) The wavelength dispersion of the refractive index is small.
(5) The durability is good.

DISCLOSURE OF THE INVENTION

Problem that the Invention is to Solve

However, conventional materials such as a polymer liquid crystal disclosed in JP-A-10-195138 had a problem that they are insufficient in durability against blue laser light.

MEANS OF SOLVING THE PROBLEM

The present invention has been made to solve the above problem, and it provides a novel compound satisfying the properties required for an optical anisotropic material and an optical element and having high durability against blue laser light, a liquid crystal composition containing the compound, an optical anisotropic material obtained by polymerizing the liquid crystal composition, and an optical element. Namely, the present invention provides the following.

1. A compound represented by the following formula (1):

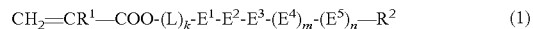

(1)

provided that the symbols in the formula have the following meanings:

$R^1$: a hydrogen atom or a methyl group;
$R^2$: a $C_{1-8}$ alkyl group;
L: —$(CH_2)_pO$—, —$(CH_2)_q$—, -Cy-COO— (Cy is a trans-1,4-cyclohexylene group), -Cy-OCO—, -$E^6$—$(CH_2)_2$—, -$E^7$—$CH_2O$— or -$E^8$—O— (wherein each of p and q which are independent of each other, is an integer of from 2 to 8);
$E^1$, $E^2$, $E^3$, $E^4$, $E^5$, $E^6$, $E^7$, $E^8$: each independently a 1,4-phenylene group or a trans-1,4-cyclohexylene group (provided that at least one of $E^1$, $E^2$ and $E^3$ is a trans-1,4-cyclohexylene group, and in a case where L is -Cy-OCO—, $E^1$ is a trans-1,4-cyclohexylene group), provided that the above 1,4-phenylene group and trans-1,4-cyclohexylene group may be such that a hydrogen atom bonded to a carbon atom in each group may be substituted by a fluorine atom, a chlorine atom or a methyl group; and
k, m, n: each independently 0 or 1, provided that when k is 1 and L is -Cy-COO—,-Cy-OCO—, -$E^6$—$(CH_2)_2$—, -$E^7$—$CH_2O$— or -$E^8$-O—, at least one of m and n is 0.

2. A liquid crystal composition containing at least two compounds selected from the compounds as defined in the above 1 or at least one compound as defined in the above 1 and at least one polymerizable liquid crystal other than the compound as defined in the above 1.

3. The liquid crystal composition according to the above 2, wherein the amount of the compound as defined in the above 1 is from 50 to 100 mass % based on the total amount of the polymerizable liquid crystal in the liquid crystal composition.

4. The liquid crystal composition according to the above 2, wherein the total content of the compound as defined in the above 1 and another polymerizable liquid crystal is at least 90 mass % based on the liquid crystal composition.

5. The liquid crystal composition according to any one of the above 2 to 4, wherein the proportion of the compound as defined in the above 1 to the total polymerizable liquid crystal in the liquid crystal composition is at least 20 mol %.

6. An optical anisotropic material obtained by polymerizing the liquid crystal composition as defined in any one of the above 2 to 5 in a state where the liquid crystal composition shows a liquid crystal phase and in a state where the liquid crystal is aligned.

7. The optical anisotropic material according to the above 6, which is used by transmitting laser light having a wavelength of from 300 to 450 nm therethrough.

8. An optical element obtained by sandwiching the liquid crystal composition as define in any one of the above 2 to 5 in a pair of supports, and polymerizing the liquid crystal composition in a state where it shows a liquid crystal phase and in a state where the liquid crystal is aligned.

9. The optical element according to the above 8, which is used by transmitting laser light having a wavelength of from 300 to 450 nm therethrough.

10. A diffraction element, which employs the optical element as defined in the above 8 or 9.
11. A phase plate, which employs the optical element as defined in the above 8 or 9.

Effects of the Invention

According to the present invention, a novel compound, a liquid crystal composition containing the compound, an optical anisotropic material obtained by polymerizing the liquid crystal composition, and an optical element can be obtained. The optical anisotropic material and the optical element are excellent in durability against blue laser light.

BEST MODE FOR CARRYING OUT THE INVENTION

In this specification, a compound represented by the formula (1) will also be referred to as a compound (1). The same applies to other compounds. "Ph" represents a 1,4-phenylene group, and "Cy" represents a trans-1,4-cyclohexylene group. These cyclic groups may be unsubstituted groups, a hydrogen atom bonded to a carbon atom in each group may be substituted by a fluorine atom, a chlorine atom or a methyl group, and each group is preferably an unsubstituted group. In a case where the cyclic group is a 1,4-cyclohexylene group, the bonds at the 1-position and 4-position are in the trans form. Further, in a case where the alkyl group has a structural isomeric group, all such groups are included, and a linear alkyl group is preferred.

A compound having both liquid crystallinity and polymerizability will be hereinafter referred to as a polymerizable liquid crystal. The following description regarding the wavelength is meant to cover the range of the center wavelength±2 nm. Further, the refractive index anisotropy will be abbreviated as Δn.

The compound of the present invention is a compound represented by the following formula (1). This compound (1) is one type of a polymerizable liquid crystal having both polymerizability and liquid crystallinity.

$$CH_2=CR^1-COO-(L)_k-E^1-E^2-E^3-(E^4)_m-(E^5)_n-R^2 \quad (1)$$

$R^1$ is a hydrogen atom or a methyl group and is preferably a hydrogen atom. If $R^1$ is a hydrogen atom, the polymerization reaction readily proceeds when the after-mentioned liquid crystal composition containing the compound (1), is subjected to photopolymerization to obtain an optical anisotropic material and an optical element, such being preferred. Further, the properties as an optical anisotropic material and an optical element obtained by the photopolymerization are less susceptible to an influence of the external environment (such as the temperature), and therefore, there is also an advantage such that the in-plane distribution of the retardation is small.

$R^2$ is a $C_{1-8}$ alkyl group, whereby the melting point ($T_m$) (i.e. the crystal phase-nematic phase phase transition point) of the liquid crystal composition containing the compound (1) can be lowered. $R^2$ is preferably a $C_{2-6}$ alkyl group. Further, $R^2$ preferably has a linear structure, whereby the temperature range within which the compound (1) shows liquid crystallinity will be broad.

L is —$(CH_2)_pO$—, —$(CH_2)_q$—, -Cy-COO—, -Cy-OCO—, -$E^6$—$(CH_2)_2$—, -$E^7$—$CH_2O$— or -$E^8$—O— (wherein each of p and q which are independent of each other, is an integer of from 2 to 8, preferably an integer of from 4 to 6, and each of $E^6$, $E^7$ and $E^8$ is a 1,4-phenylene group or a trans-1,4-cyclohexylene group, and is preferably an unsubstituted group).

L is preferably -Cy-COO—, -Cy-OCO—, —$(CH_2)_pO$— (preferably —$(CH_2)_6O$—) or -Ph-$(CH_2)_2O$—.

In a case where L is -Cy-COO—, a large Δn will be developed in a case where the after-mentioned polymerization reaction is carried out to obtain an optical anisotropic material and an optical element. L is preferably -Cy-OCO—, in view of favorable mutual solubility with another polymerizable liquid crystal and with a view to lowering $T_m$.

Further, in general, when a polymerizable liquid crystal is polymerized, the value of Δn tends to decrease after the polymerization reaction, but in a case where L is a group having a polymethylene group such as —$(CH_2)_pO$— or —$(CH_2)_q$—, the decrease in the Δn value after the polymerization reaction can be suppressed.

Each of k, m and n which are independent of one another, is 0 or 1. However, in a case where k is 1 and L is -Cy-COO—, -Cy-OCO—, -$E^6$-$(CH_2)_2$—, -$E^7$-$CH_2O$— or -$E^8$-O—, at least one of m and n is 0.

Each of $E^1$, $E^2$, $E^3$, $E^4$ and $E^5$ which are independent of one another, is a 1,4-phenylene group or a trans-1,4-cyclohexylene group. The number of cyclic groups which the compound (1) has is from 3 to 5, at least one of $E^1$, $E^2$ and $E^3$ is Cy, and in a case where L is -Cy-OCO—, $E^1$ is a trans-1,4-cyclohexylene group. Further, at least one of $E^1$, $E^2$ and $E^3$ is preferably Ph. Further, in a case where the compound has a plurality of Ph, the number of Ph which are directly bonded is preferably 2.

The structure of "$E^1$-$E^2$-$E^3$" is preferably "Cy-Ph-Ph" in view of large Δn of the compound (1). By such a structure, a liquid crystal composition showing a large Δn will easily be prepared. Further, the structure is preferably "Cy-Ph-Cy" with a view to suppressing absorption of blue laser light.

The compound (1) is preferably the following compound (1A) and the following compound (1B).

$$CH_2=CR^1-COO-L-E^1-E^2-E^3-R^2 \quad (1A)$$

$$CH_2=CR^1-COO-E^1-E^2-E^3-R^2 \quad (1B)$$

The compound (1A) is preferably the following compounds (1Aa1) to (1Aa4).

$$CH_2=CR^1-COO-Cy-COO-E^1-E^2-E^3-R^2 \quad (1Aa1)$$

$$CH_2=CR^1-COO-Cy-OCO-E^1-E^2-E^3-R^2 \quad (1Aa2)$$

$$CH_2=CR^1-COO-(CH_2)_pO-E^1-E^2-E^3-R^2 \quad (1Aa3)$$

$$CH_2=CR^1-COO-Ph-(CH_2)_2-E^1-E^2-E^3-R^2 \quad (1Aa4)$$

More specifically, the following compounds (1Aaa1) to (1Aaa4) are preferred.

$$CH_2=CR^1-COO-Cy-COO-Cy-Ph-Ph-R^2 \quad (1Aaa1)$$

$$CH_2=CR^1-COO-Cy-COO-Cy-Ph-Cy-R^2 \quad (1Aaa2)$$

$$CH_2=CR^1-COO-Cy-OCO-Cy-Ph-Ph-R^2 \quad (1Aaa3)$$

$$CH_2=CR^1-COO-Cy-OCO-Cy-Ph-Cy-R^2 \quad (1Aaa4)$$

$$CH_2=CR^1-COO-(CH_2)_pO-Ph-Cy-Ph-R^2 \quad (1Aaa5)$$

$$CH_2=CR^1-COO-Ph-(CH_2)_2-Ph-Ph-Cy-R^2 \quad (1Aaa6)$$

Furthermore specifically, the following compounds may be mentioned, and preferred is a compound wherein $R^1$ is a hydrogen atom, particularly preferred is a compound wherein the moiety corresponding to R2 is a $C_{2-6}$ linear alkyl group. With respect to the compounds (1Aaa51) to (1Aaa58), preferred is a compound wherein p is 4 to 6, particularly preferred is a compound wherein p is 6.

| | |
|---|---|
| $CH_2=CH-COO-Cy-COO-Cy-Ph-Ph-CH_3$ | (1Aaa11) |
| $CH_2=CH-COO-Cy-COO-Cy-Ph-Ph-C_2H_5$ | (1Aaa12) |
| $CH_2=CH-COO-Cy-COO-Cy-Ph-Ph-C_3H_7$ | (1Aaa13) |
| $CH_2=CH-COO-Cy-COO-Cy-Ph-Ph-C_4H_9$ | (1Aaa14) |
| $CH_2=CH-COO-Cy-COO-Cy-Ph-Ph-C_5H_{11}$ | (1Aaa15) |
| $CH_2=CH-COO-Cy-COO-Cy-Ph-Ph-C_6H_{13}$ | (1Aaa16) |
| $CH_2=CH-COO-Cy-COO-Cy-Ph-Ph-C_7H_{15}$ | (1Aaa17) |
| $CH_2=CH-COO-Cy-COO-Cy-Ph-Ph-C_8H_{17}$ | (1Aaa18) |
| $CH_2=CH-COO-Cy-COO-Cy-Ph-Cy-CH_3$ | (1Aaa21) |
| $CH_2=CH-COO-Cy-COO-Cy-Ph-Cy-C_2H_5$ | (1Aaa22) |
| $CH_2=CH-COO-Cy-COO-Cy-Ph-Cy-C_3H_7$ | (1Aaa23) |
| $CH_2=CH-COO-Cy-COO-Cy-Ph-Cy-C_4H_9$ | (1Aaa24) |
| $CH_2=CH-COO-Cy-COO-Cy-Ph-Cy-C_5H_{11}$ | (1Aaa25) |
| $CH_2=CH-COO-Cy-COO-Cy-Ph-Cy-C_6H_{13}$ | (1Aaa26) |
| $CH_2=CH-COO-Cy-COO-Cy-Ph-Cy-C_7H_{15}$ | (1Aaa27) |
| $CH_2=CH-COO-Cy-COO-Cy-Ph-Cy-C_8H_{17}$ | (1Aaa28) |
| $CH_2=CH-COO-Cy-OCO-Cy-Ph-Ph-CH_3$ | (1Aaa31) |
| $CH_2=CH-COO-Cy-OCO-Cy-Ph-Ph-C_2H_5$ | (1Aaa32) |
| $CH_2=CH-COO-Cy-OCO-Cy-Ph-Ph-C_3H_7$ | (1Aaa33) |
| $CH_2=CH-COO-Cy-OCO-Cy-Ph-Ph-C_4H_9$ | (1Aaa34) |
| $CH_2=CH-COO-Cy-OCO-Cy-Ph-Ph-C_5H_{11}$ | (1Aaa35) |
| $CH_2=CH-COO-Cy-OCO-Cy-Ph-Ph-C_6H_{13}$ | (1Aaa36) |
| $CH_2=CH-COO-Cy-OCO-Cy-Ph-Ph-C_7H_{15}$ | (1Aaa37) |
| $CH_2=CH-COO-Cy-OCO-Cy-Ph-Ph-C_8H_{17}$ | (1Aaa38) |
| $CH_2=CH-COO-Cy-OCO-Cy-Ph-Cy-CH_3$ | (1Aaa41) |
| $CH_2=CH-COO-Cy-OCO-Cy-Ph-Cy-C_2H_5$ | (1Aaa42) |
| $CH_2=CH-COO-Cy-OCO-Cy-Ph-Cy-C_3H_7$ | (1Aaa43) |
| $CH_2=CH-COO-Cy-OCO-Cy-Ph-Cy-C_4H_9$ | (1Aaa44) |
| $CH_2=CH-COO-Cy-OCO-Cy-Ph-Cy-C_5H_{11}$ | (1Aaa45) |
| $CH_2=CH-COO-Cy-OCO-Cy-Ph-Cy-C_6H_{13}$ | (1Aaa46) |
| $CH_2=CH-COO-Cy-OCO-Cy-Ph-Cy-C_7H_{15}$ | (1Aaa47) |
| $CH_2=CH-COO-Cy-OCO-Cy-Ph-CY-C_8H_{17}$ | (1Aaa48) |
| $CH_2=C(CH_3)-COO-Cy-COO-Cy-Ph-Ph-CH_3$ | |
| $CH_2=C(CH_3)-COO-Cy-COO-Cy-Ph-Ph-C_2H_5$ | |
| $CH_2=C(CH_3)-COO-Cy-COO-Cy-Ph-Ph-C_3H_7$ | |
| $CH_2=C(CH_3)-COO-Cy-COO-Cy-Ph-Ph-C_4H_9$ | |
| $CH_2=C(CH_3)-COO-Cy-Coo-Cy-Ph-Ph-C_5H_{11}$ | |
| $CH_2=C(CH_3)-COO-Cy-COO-Cy-Ph-Ph-C_6H_{13}$ | |
| $CH_2=C(CH_3)-COO-Cy-COO-Cy-Ph-Ph-C_7H_{15}$ | |
| $CH_2=C(CH_3)-COO-Cy-COO-Cy-Ph-Ph-C_8H_{17}$ | |
| $CH_2=CR^1-COO-(CH_2)_pO-Ph-Cy-Ph-CH_3$ | (1Aaa51) |
| $CH_2=CR^1-COO-(CH_2)_pO-Ph-Cy-Ph-C_2H_5$ | (1Aaa52) |
| $CH_2=CR^1-COO-(CH_2)_pO-Ph-Cy-Ph-C_3H_7$ | (1Aaa53) |
| $CH_2=CR^1-COO-(CH_2)_pO-Ph-Cy-Ph-C_4H_9$ | (1Aaa54) |
| $CH_2=CR^1-COO-(CH_2)_pO-Ph-Cy-Ph-C_5H_{11}$ | (1Aaa55) |
| $CH_2=CR^1-COO-(CH_2)_pO-Ph-Cy-Ph-C_6H_{13}$ | (1Aaa56) |
| $CH_2=CR^1-COO-(CH_2)_pO-Ph-Cy-Ph-C_7H_{15}$ | (1Aaa57) |
| $CH_2=CR^1-COO-(CH_2)_pO-Ph-Cy-Ph-C_8H_{17}$ | (1Aaa58) |
| $CH_2=CR^1-COO-Ph-(CH_2)_2-Ph-Ph-Cy-CH_3$ | (1Aaa61) |
| $CH_2=CR^1-COO-Ph-(CH_2)_2-Ph-Ph-Cy-C_2H_5$ | (1Aaa62) |
| $CH_2=CR^1-COO-Ph-(CH_2)_2-Ph-Ph-Cy-C_3H_7$ | (1Aaa63) |
| $CH_2=CR^1-COO-Ph-(CH_2)_2-Ph-Ph-Cy-C_4H_9$ | (1Aaa64) |
| $CH_2=CR^1-COO-Ph-(CH_2)_2-Ph-Ph-Cy-C_5H_{11}$ | (1Aaa65) |
| $CH_2=CR^1-COO-Ph-(CH_2)_2-Ph-Ph-Cy-C_6H_{13}$ | (1Aaa66) |
| $CH_2=CR^1-COO-Ph-(CH_2)_2-Ph-Ph-Cy-C_7H_{15}$ | (1Aaa67) |
| $CH_2=CR^1-COO-Ph-(CH_2)_2-Ph-Ph-Cy-C_8H_{17}$ | (1Aaa68) |

The compound (1B) is preferably the following compound (1Ba) and the following compound (1Bb).

| | |
|---|---|
| $CH_2=CR^1-COO-Ph-Cy-Ph-R^2$ | (1Ba) |
| $CH_2=CR^1-COO-Ph-Ph-Cy-R^2$ | (1Bb) |

As the compound (1Ba), the following compounds may be mentioned. Among them, the following compounds (1Ba-1) to (1Ba-8) wherein $R^1$ is a hydrogen atom are preferred, and the following compounds (1Ba-2) to (1Ba-6) are particularly preferred.

| | |
|---|---|
| $CH_2=CH-COO-Ph-Cy-Ph-CH_3$ | (1Ba-1) |
| $CH_2=CH-COO-Ph-Cy-Ph-C_2H_5$ | (1Ba-2) |
| $CH_2=CH-COO-Ph-Cy-Ph-C_3H_7$ | (1Ba-3) |
| $CH_2=CH-COO-Ph-Cy-Ph-C_4H_9$ | (1Ba-4) |
| $CH_2=CH-COO-Ph-Cy-Ph-C_5H_{11}$ | (1Ba-5) |
| $CH_2=CH-COO-Ph-Cy-Ph-C_6H_{13}$ | (1Ba-6) |
| $CH_2=CH-COO-Ph-Cy-Ph-C_7H_{15}$ | (1Ba-7) |
| $CH_2=CH-COO-Ph-Cy-Ph-C_8H_{17}$ | (1Ba-8) |
| $CH_2=C(CH_3)-COO-Ph-Cy-Ph-CH_3$ | (1Ba-9) |
| $CH_2=C(CH_3)-COO-Ph-Cy-Ph-C_2H_5$ | (1Ba-10) |
| $CH_2=C(CH_3)-COO-Ph-Cy-Ph-C_3H_7$ | (1Ba-11) |
| $CH_2=C(CH_3)-COO-Ph-Cy-Ph-C_4H_9$ | (1Ba-12) |

| | |
|---|---|
| $CH_2=C(CH_3)$—COO-Ph-Cy-Ph-$C_5H_{11}$ | (1Ba-13) |
| $CH_2=C(CH_3)$—COO-Ph-Cy-Ph-$C_6H_{13}$ | (1Ba-14) |
| $CH_2=C(CH_3)$—COO-Ph-Cy-Ph-$C_7H_{15}$ | (1Ba-15) |
| $CH_2=C(CH_3)$—COO-Ph-Cy-Ph-$C_8H_{17}$ | (1Ba-16) |

As the compound (1Bb), the following compounds may be mentioned, and preferred are the following compounds (1Bb-1) to (1Bb-8) wherein $R^1$ is a hydrogen atom, and particularly preferred are the following compounds (1Bb-2) to (1Bb-6)

| | |
|---|---|
| $CH_2=CH$—COO-Ph-Ph-Cy-$CH_3$ | (1Bb-1) |
| $CH_2=CH$—COO-Ph-Ph-Cy-$C_2H_5$ | (1Bb-2) |
| $CH_2=CH$—COO-Ph-Ph-Cy-$C_3H_7$ | (1Bb-3) |
| $CH_2=CH$—COO-Ph-Ph-Cy-$C_4H_9$ | (1Bb-4) |
| $CH_2=CH$—COO-Ph-Ph-Cy-$C_5H_{11}$ | (1Bb-5) |
| $CH_2=CH$—COO-Ph-Ph-Cy-$C_6H_{13}$ | (1Bb-6) |
| $CH_2=CH$—COO-Ph-Ph-Cy-$C_7H_{15}$ | (1Bb-7) |
| $CH_2=CH$—COO-Ph-Ph-Cy-$C_8H_{17}$ | (1Bb-8) |
| $CH_2=C(CH_3)$—COO-Ph-Ph-Cy-$CH_3$ | (1Bb-9) |
| $CH_2=C(CH_3)$—COO-Ph-Ph-Cy-$C_2H_5$ | (1Bb-10) |
| $CH_2=C(CH_3)$—COO-Ph-Ph-Cy-$C_3H_7$ | (1Bb-11) |
| $CH_2=C(CH_3)$—COO-Ph-Ph-Cy-$C_4H_9$ | (1Bb-12) |
| $CH_2=C(CH_3)$—COO-Ph-Ph-Cy-$C_5H_{11}$ | (1Bb-13) |
| $CH_2=C(CH_3)$—COO-Ph-Ph-Cy-$C_6H_{13}$ | (1Bb-14) |
| $CH_2=C(CH_3)$—COO-Ph-Ph-Cy-$C_7H_{15}$ | (1Bb-15) |
| $CH_2=C(CH_3)$—COO-Ph-Ph-Cy-$C_8H_{17}$ | (1Bb-16) |

Now, a process for producing the compound (1) of the present invention will be described with reference to specific examples (symbols in the formulae are as defined above).

(Preparation Process 1)

As a process for preparing the compound (1) of the formula (1) wherein L is -Cy-OCO—, $E^1$ is Cy and $E^2$ is Ph, the following process may be mentioned. Namely, the following compound (A) and a compound represented by the formula $CH_2=CR^1$—C(O)Cl are reacted to obtain compound (B), and then the compound (B) and compound (C) are subjected to esterification reaction.

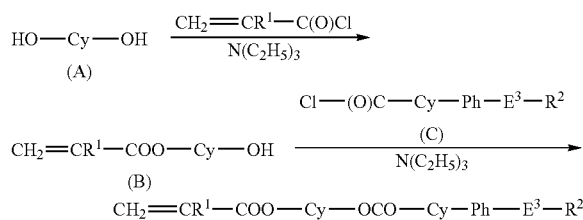

(Preparation Process 2)

As a process for preparing the compound (1) of the formula (1) wherein L is -Cy-COO—, $E^1$ is Cy and $E^2$ is Ph, the following process may be mentioned. Namely, the following compound (D) and a compound represented by the formula $CH_2=CR^1$—C(O)Cl are subjected to esterification reaction to obtain the following compound (E), and then the compound (E) and the following compound (F) are subjected to condensation reaction. Here, DCC represents dicyclohexylcarbodiimide.

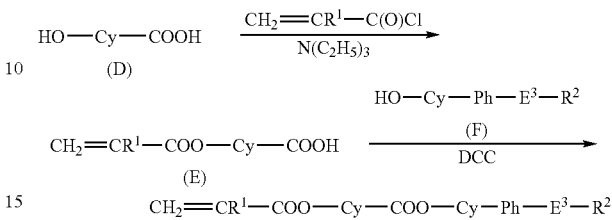

(Preparation Process 3)

The compound (1Ba) is obtained by a process of reacting the following compound (G), the following compound (H) and Grignard agent prepared from magnesium to obtain the following compound (I), subjecting the compound (I) to dehydration reaction to obtain the following compound (J), reducing the compound (J) to obtain the following compound (K), subjecting the compound (K) to deprotection reaction to obtain the following compound (M), and subjecting the compound (M) and a compound represented by the formula $CH_2=CR^1$—C(O)Cl to esterification reaction.

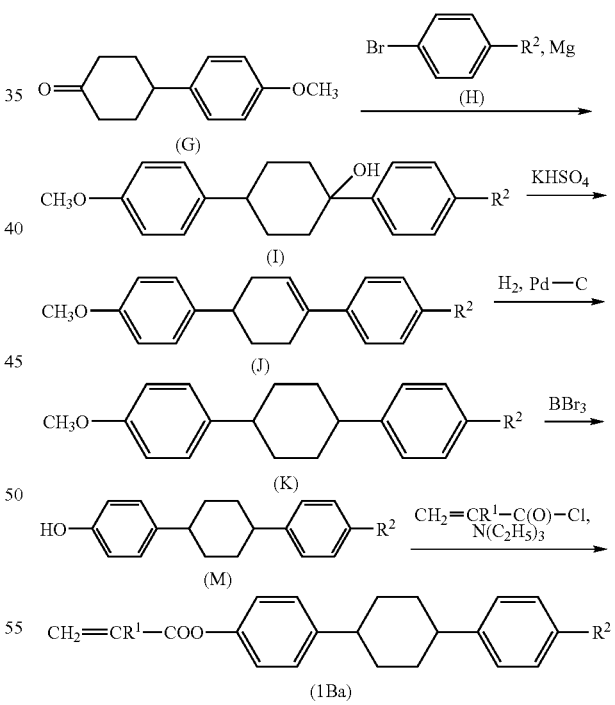

(Preparation Process 4)

As a process for preparing the compound (1) of the formula (1) wherein L is —$(CH_2)_pO$—, m=n=0, $E^1=E^3=Ph$ and $E^2=Cy$, the following process may be mentioned. Namely, the compound can be obtained by reacting the above compound (M) and a compound represented by the formula $CH_2=CR^1$—COO—$(CH_2)_p$—Br.

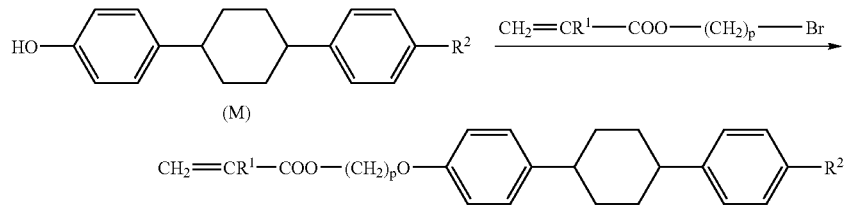

(Preparation Process 5)

The compound (1Bb) can be obtained by a process of reacting the following compound (N) and the following compound (P) to obtain compound (Q), subjecting the compound (Q) to deprotection reaction to obtain the following compound (R), and reacting the compound (R) and a compound represented by the formula $CH_2=CR^1-C(O)Cl$.

(Preparation Process 6)

As a process for preparing the compound (1) of the formula (1) wherein L is $-Ph-(CH_2)_2-$, m=n=0, $E^1=E^2=Ph$ and $E^3=Cy$, the following process may be mentioned. Namely, the following compound (S) and the following compound (T) are subjected to coupling reaction to obtain the following compound (U), the compound (U) is subjected to deprotection reaction to obtain the following compound (V), and the compound (V) and a compound represented by the formula $CH_2=CR^1-C(O)Cl$ are subjected to esterification reaction.

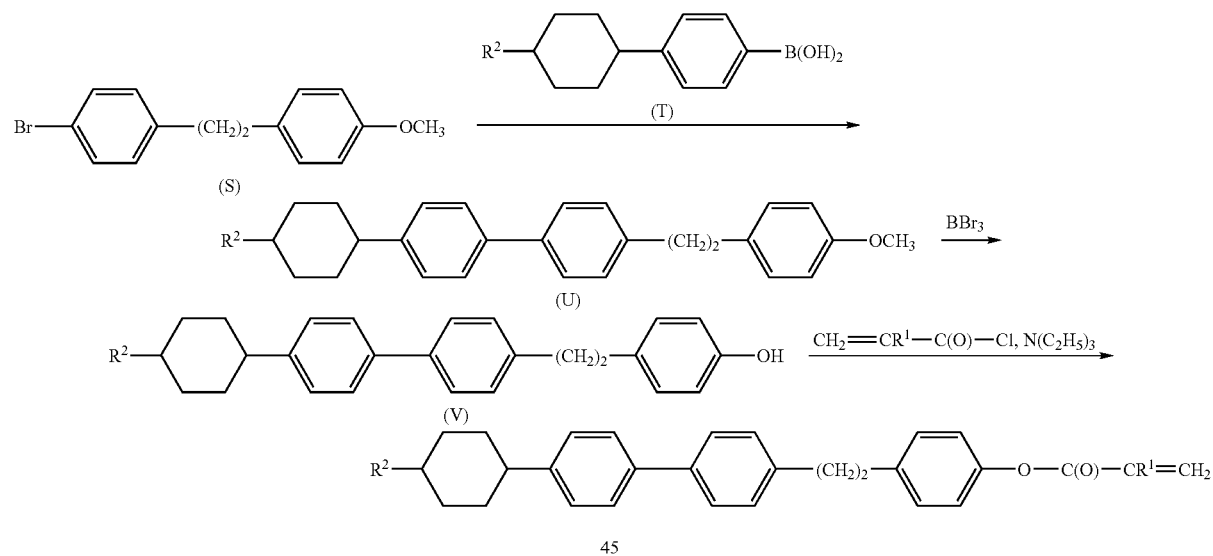

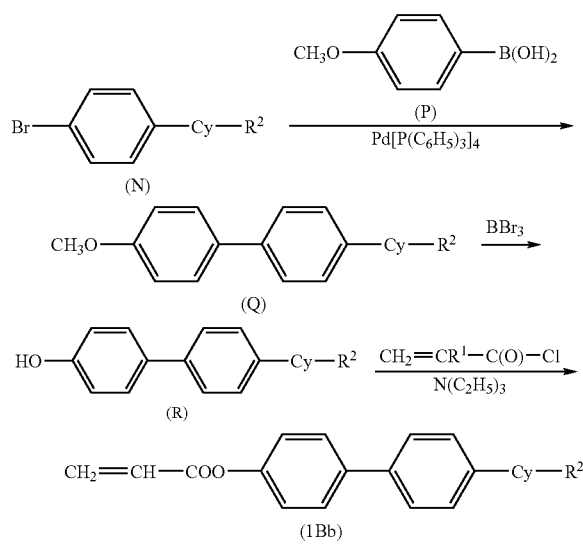

The compound (1) of the present invention has good durability against blue laser light, which is derived from the structure wherein three, four or five cyclic groups are directly bonded.

Further, such a compound (1) has no -Ph-CO— structure and has -Cy- as a cyclic saturated hydrocarbon group which absorbs no light even in a short wavelength region of at most 400 nm, whereby absorption of blue laser light is small. Further, in a case where it has -Ph- (particularly in a case where it has at least two Ph), Δn can be made large.

In a case where the electron-donative -Cy- is directly bonded to the electron-attractive acryloyl group or methacryloyl group, such as the compounds (1Aaa1) to (1Aaa4), it is considered that stabilization of the ester bond also contributes to improvement in durability. Further, in general, when a polymerizable liquid crystal is polymerized, the value of Δn tends to decrease after the polymerization reaction. However, in a case where a structure with a polymethylene group is bonded to an acryloyl group or a methacryloyl group such as in the compound (1Aaa5), the decrease in the Δn value can be suppressed.

Further, in a case where Ph and Cy are alternately bonded, whereby the conjugation is discontinuous as in the compound (1Ba), it is considered that such a structure contributes to suppression of absorption of blue laser light. Further, by such a structure, the melting point ($T_m$) of the compound (1) can be lowered, and mutual solubility with another compound can be improved.

Accordingly, by the use of the compound (1), an optical anisotropic material and an optical element which have sufficient durability against blue laser light and also have excellent characteristics such as the phase difference and be provided.

The compound (1) of the present invention is used preferably as one component of a liquid crystal composition to obtain a polymer liquid crystal. In such a case, the compound (1) of the present invention shows a sufficiently broad liquid crystal temperature range by itself and has such a characteristic that the temperature range in which the compound shows a liquid crystal phase is broad particularly to a high temperature side. However, in order that the liquid crystal composition to obtain a polymer liquid crystal shows liquid crystallinity also in a low temperature side, the liquid crystal composition is preferably a liquid crystal composition containing at least two compounds selected from the compounds (1) or a liquid crystal composition containing the compound (1) and a polymerizable liquid crystal other than the compound (1). By the use of such a liquid crystal composition, the temperature range in which the liquid crystal composition shows a liquid crystal phase can be further broader. Further, due to a drop in the melting point ($T_m$), the handling efficiency will improve.

In a case where the liquid crystal composition contains at least two compounds selected from the compounds (1), it preferably contains at least two compounds having the same structure other than the $R^2$ moiety but differing in the number of carbon atoms in the $R^2$ moiety, for favorable mutual solubility. Specifically, it preferably contains at least one member selected from compounds wherein $R^2$ is $C_{2-4}$ linear alkyl group and at least one member selected from compounds wherein $R^2$ is a $C_{5-8}$ linear alkyl group, and it particularly preferably contains a compound wherein $R^2$ is a n-propyl group and a compound wherein $R^2$ is a n-pentyl group. Further, it also preferably contains at least two compounds having the same mesogen structure.

In a case where the liquid crystal composition contains the compound (1) and a polymerizable liquid crystal other than the compound (1), the polymerizable liquid crystal other than the compound (1) is preferably a compound having an acryloyl group or a methacryloyl group, particularly preferably a compound having an acryloyl group. Further, the polymerizable liquid crystal preferably contains no -Ph-CO— structure in its mesogen structure, whereby high durability against blue laser light will be achieved.

As the polymerizable liquid crystal other than the compound (1), the following compounds (3A) to (3C) are preferred. Hereinafter sometimes they will generically be referred to as a compound (3).

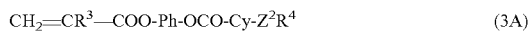  (3A)

  (3B)

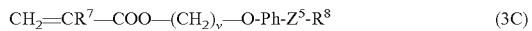  (3C)

In the formulae, Ph and Cy are as defined above, and the other symbols have the following meanings:

$R^3$, $R^5$, $R^7$: each independently a hydrogen atom or a methyl group;

$R^4$, $R^6$, $R^8$: each independently a $C_{1-8}$ alkyl group;

$Z^2$, $Z^3$, $Z^4$, $Z^5$: each independently a 1,4-phenylene group or a trans-1,4-cyclohexylene group; and v: an integer of from 1 to 8.

As specific examples of the compounds (3A) to (3C), the following compounds (3Aa), (3Ab), (3Bc), (3Bd), (3Be), (3Cf) and (3Cg) may be mentioned (provided that in the formulae, Ph and Cy are as defined above, each of v1 and v2 which are independent of each other, is an integer of from 1 to 8, and each of a to g which are independent of one another, is an integer of from 1 to 8, preferably an integer of from 2 to 6, particularly preferably 3 or 5). One or more of these compounds may be used.

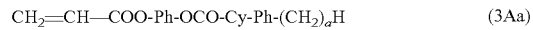  (3Aa)

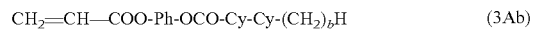  (3Ab)

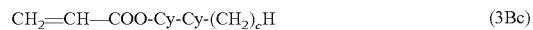  (3Bc)

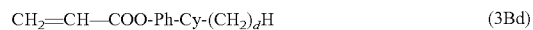  (3Bd)

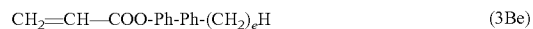  (3Be)

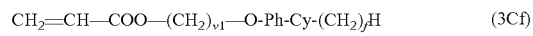  (3Cf)

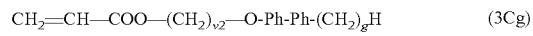  (3Cg)

A preferred combination for preparation of a liquid crystal composition is properly selected in accordance with the type of the compound (1), and for example, the following combinations are preferred.

(1) A liquid crystal composition containing the following compound (1Aaa1) and the following compound (3Bc):

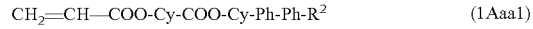  (1Aaa1)

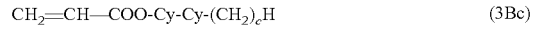  (3Bc)

(2) A liquid crystal composition containing the following compound (1Ba) and the following compound (3Bc):

  (1Ba)

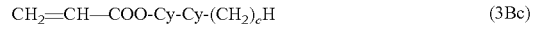  (3Bc)

(3) A liquid crystal composition containing the following compound (1Ba) and the following compound (3Bd):

  (1Ba)

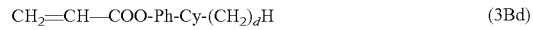  (3Bd)

(4) A liquid crystal composition containing the following compound (1Bb-3), the following compound (1Bb-5), the following compound (3Bc3) and the following compound (3Bc5):

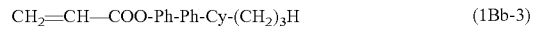  (1Bb-3)

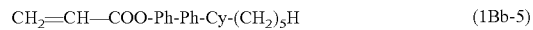  (1Bb-5)

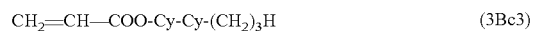  (3Bc3)

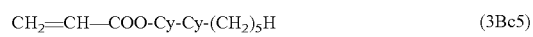  (3Bc5)

(5) A liquid crystal composition containing the following compound (1Aaa5) and the following compound (1Ba):

  (1Aaa5)

 (1Ba)

(6) A liquid crystal composition containing the following compound (1Aaa6) and the following compound (3Bc):

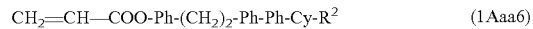  (1Aaa6)

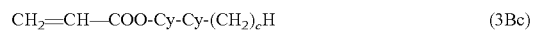  (3Bc)

The liquid crystal composition for production of a polymer liquid crystal is a liquid crystal composition containing at least 75 mass % of a polymerizable liquid crystal, preferably a liquid crystal composition containing at least 90 mass %. The liquid crystal composition may contain a non-liquid crystalline polymerizable compound or a non-polymerizable liquid crystal compound. The liquid crystal composition is preferably a liquid crystal composition containing substantially no non-liquid crystalline polymerizable compound nor non-polymerizable liquid crystal compound and containing at least 90 mass %, particularly preferably at least 95 mass % of a polymerizable liquid crystal. In the present invention, the liquid crystal composition for production of a polymer liquid crystal is preferably a liquid crystal composition containing at least 5 mass % of the compound (1) based on the entire polymerizable liquid crystal in the liquid crystal composition.

In the present invention, the liquid crystal composition suitable for production of a polymer liquid crystal is, as mentioned above, a liquid crystal composition containing at least two types of the compounds (1) or a liquid crystal composition containing at least one type of the compound (1) and at least one type of the compound (3) In such a liquid crystal composition, the total amount of the compound (1) and the compound (3) is preferably from 50 to 100 mass % based on the entire polymerizable liquid crystal in the liquid crystal composition, particularly preferably from 80 to 100 mass %.

Further, especially preferred is a liquid crystal composition containing substantially only the compound (1) or containing only the compound (1) and the compound (3) as the polymerizable liquid crystal in the liquid crystal composition. In a case where the compound (1) and the compound (3) are used in combination, the proportion of the compound (1) to the total amount of them is preferably at least 20 mol %. Particularly in a case where the compound (3) is used in combination for the purpose of broadening the temperature range in which the liquid crystal composition shows a liquid crystal phase, in order to achieve higher effects, the proportion of the compound (1A) to the total amount of them is preferably from 20 to 70 mol %, the proportion of the compound (1Ba) is preferably from 20 to 90 mol %, and the proportion of the compound (1Bb) is preferably from 20 to 70 mol %

The liquid crystal composition of the present invention may contain a component (hereinafter referred to as another component) other than the polymerizable liquid crystal such as the compound (1) and the compound (3). Such another component may, for example, be a polymerization initiator, a polymerization inhibitor, a chiral compound, an ultraviolet absorber, an antioxidant, a photostabilizer or a dichroic dye.

The total amount (hereinafter referred to as the is "total amount of the liquid crystal") of the polymerizable liquid crystal such as the compound (1) and the compound (3) contained in the liquid crystal composition, and the proportion of another component, are preferably adjusted depending upon the purpose of use. For example, in a case where a chiral compound is used as another component, the total amount of the liquid crystal is preferably from 20 to 95 mass %, particularly preferably from 50 to 95 mass % based on the liquid crystal composition. The amount of the chiral compound is preferably from 5 to 80 mass %, particularly preferably from 5 to 50 mass % based on the liquid crystal composition.

In a case where a dichroic dye is used as another component, the total amount of the liquid crystal is preferably from 80 to 99 mass %, particularly preferably from 82 to 97 mass % based on the liquid crystal composition. The amount of the dichroic dye is preferably from 1 to 20 mass %, particularly preferably from 3 to 18 mass % based on the liquid crystal composition.

In a case where an ultraviolet absorber, an antioxidant, a photostabilizer or the like is used as another component, the amount of the such a component is preferably at most 5 mass %, particularly preferably at most 2 mass % based on the liquid crystal composition. The total amount of the liquid crystal in such a case is preferably from 95 to 100 mass %, particularly preferably from 98 to 100 mass % based on the liquid crystal composition. The proportion of the polymerization initiator will be described hereinafter.

Now, the optical anisotropic material of the present invention will be described below. The optical anisotropic material of the present invention is obtained by subjecting the above liquid crystal composition to polymerization reaction in a state where the liquid crystal composition shows a liquid crystal phase and in a state where the liquid crystal is aligned.

In order to keep the state where the liquid crystal composition shows a liquid crystal phase, the temperature of the atmosphere may be kept to be at most the nematic phase-isotropic phase transition temperature ($T_c$), but $\Delta n$ of the liquid crystal composition is extremely small at a temperature in the vicinity of $T_c$. Therefore, the upper limit of the temperature of the atmosphere is preferably at most $(T_c-10)°$ C.

The polymerization reaction may, for example, be photopolymerization reaction or heat polymerization reaction, and photopolymerization reaction is preferred. The light to be used for the photopolymerization reaction is preferably ultraviolet light or visible light. In the case of photopolymerization reaction, a photopolymerization initiator is preferably used, which is properly selected from acetophenones, benzophenones, benzoins, benzyls, Michler's ketones, benzoin alkyl ethers, benzyl dimethyl ketals and thioxanthones. Such photopolymerization initiators may be used alone or in combination of two or more of them. The amount of the photopolymerization initiator is preferably from 0.1 to 5 mass %, particularly preferably from 0.3 to 2 mass % based on the entire amount of the liquid crystal composition.

Now, the optical element of the present invention will be described below. The optical element of the present invention is obtained by sandwiching the above liquid crystal composition between a pair of supports having alignment treatment applied thereto and subjecting the liquid crystal composition to polymerization reaction in a state where the liquid crystal composition shows a liquid crystal phase and in a state where the liquid crystal is aligned.

The supports are preferably supports having alignment treatment applied to a transparent substrate made of glass or a resin. The alignment treatment is carried out preferably by e.g. a method of directly rubbing the surface of the transparent substrate with e.g. fibers such as cotton, wool, nylon or polyester, a method of laminating a polyimide alignment film on the surface of the transparent substrate and then rubbing the surface of the alignment film with the above fibers, or a method of oblique evaporation of an inorganic material on the surface of the transparent substrate.

Then, spacers such as glass beads are placed on the surface to which alignment treatment has been applied, and a plurality of such supports are disposed to face each other with a desired space, and the liquid crystal composition is sandwiched between the supports, followed by the polymerization reaction. The polymerization reaction may be carried out in the same manner as in the polymerization reaction to prepare the optical anisotropic material. The optical element prepared by the polymerization reaction may be used as it is sandwiched between the supports, or it may be peeled from the supports and used.

The optical anisotropic material and the optical element of the present invention have high durability against blue laser light and thus are useful for an optical anisotropic material and an optical element through which such laser light is transmitted. Particularly, they are useful as an optical anisotropic material to be used to modulate the phase state and/or wavefront state of the laser light and an optical element having a member comprising the optical anisotropic material. For example, the optical element may be used as mounted on an optical head device as a diffraction element such as a polarizing hologram, a phase plate, or the like. As a polarizing hologram, there may, for example, be a case where signal lights due to the reflection of lights emitted from a laser light source on an information recorded surface of an optical disk, are separated and then introduced into a photo-receiving element. As a phase plate, there may be a case where it is used as a half wavelength plate, to control the phase difference of the light emitted from a laser light source, or a case where it is installed as a quarter wavelength plate in an optical path to stabilize the output of the laser light source.

EXAMPLES

Now, the present invention will be described in detail with reference to examples. However, the present invention is by no means restricted to such specific examples.

Examples 1 to 20 are examples of the present invention, and Example 21 is a Comparative Example. In the following Examples, Irgacure 907 manufactured by Ciba Specialty Chemicals K.K. was used as a photopolymerization initiator.

Example 1

Preparation Example for compound (1Aaa13)

Example 1-1

Preparation Example for Compound (E-1)

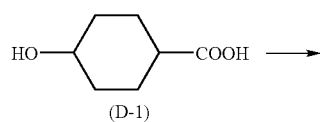

-continued

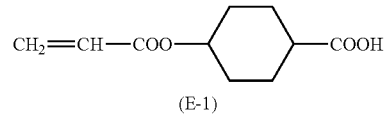

In a three-necked flask equipped with a dropping apparatus and a stirrer, compound (D-1) (25 g), triethylamine (21.7 g) and THF (300 mL) were added. Acrylic acid chloride (18.8 g) was dropwise added thereto under cooling with ice so that the reaction temperature would not exceed 20° C. After completion of the dropwise addition, stirring was carried out at room temperature for 24 hours, concentrated hydrochloric acid (2 mL), water (200 mL) and diethyl ether (200 mL) were added to the reaction solution, followed by liquid separation, and the resulting organic layer was recovered. The recovered organic layer was washed with water and then dried over anhydrous magnesium sulfate. After anhydrous magnesium sulfate was separated by filtration, the solvent was distilled off to obtain crude product (31 g) containing compound (E-1).

Example 1-2

Preparation Example for Compound (1Aaa13)

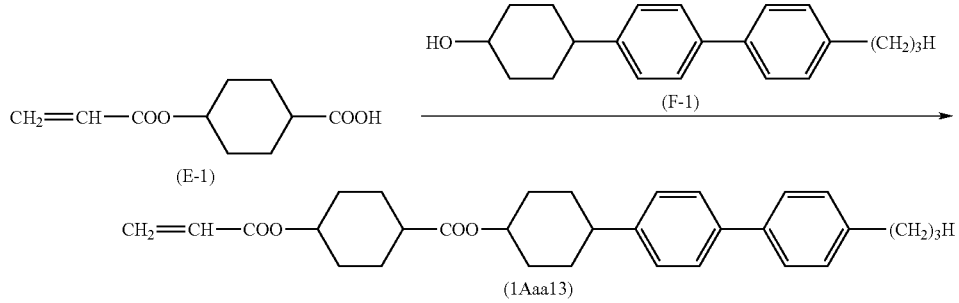

In a three-necked flask equipped with a stirrer, the crude product (9.3 g) containing the compound (E-1) obtained in Example 1-1, compound (F-1) (14.4 g), 1,3-dicyclohexylcarbodiimide (DCC) (16.7 g), dimethylaminopyridine (1.8 g) and dichloromethane (300 mL) were added, followed by stirring at room temperature for 24 hours.

After completion of the stirring, insoluble matters were removed by filtration, and a 1 mol/L HCl aqueous solution (100 mL) was added to the filtrate, followed by liquid separation, and the resulting organic layer was recovered. The organic layer was washed with water, and anhydrous magnesium sulfate was added thereto for drying. After anhydrous magnesium sulfate was removed by filtration, the solvent was distilled off to obtain crude crystals. The crude crystals were dissolved in dichloromethane (30 mL), followed by purification by silica gel column chromatography (developing solution: hexane/ethyl acetate=6/4, volume ratio) to obtain a fraction containing the aimed product. The fraction was concentrated, and the obtained white powdery crystals were recrystallized from hexane/dichloromethane (8/2, volume ratio) (200 mL) to obtain compound (1Aaa13) (10.6 g). The yield was 48%.

The compound (1Aaa13) had a phase transition temperature from crystal to a nematic phase of 134° C. and a phase transition temperature from a nematic phase to an isotropic phase of 299.6° C. (extrapolation value) Further, Δn of the compound (1Aaa13) to laser light having a wavelength of 589 nm at 60° C. was 0.1863 (extrapolation value).

The results of measurement of the $^1$HNMR spectrum of the compound (1Aaa13) are as follows.

$^1$HNMR (400 MHz, solvent: CDCl$_3$, internal standard: TMS) δ (ppm): 0.97 (t, 3H), 1.4-1.8 (m, 12H), 2.0-2.4 (m, 7H), 2.6-2.7 (m, 3H), 4.81 (m, 2H), 5.8-6.7 (m, 3H), 7.2-7.4 (dd, 8H).

Example 2

Preparation Example for Compound (1Aaa53-6)

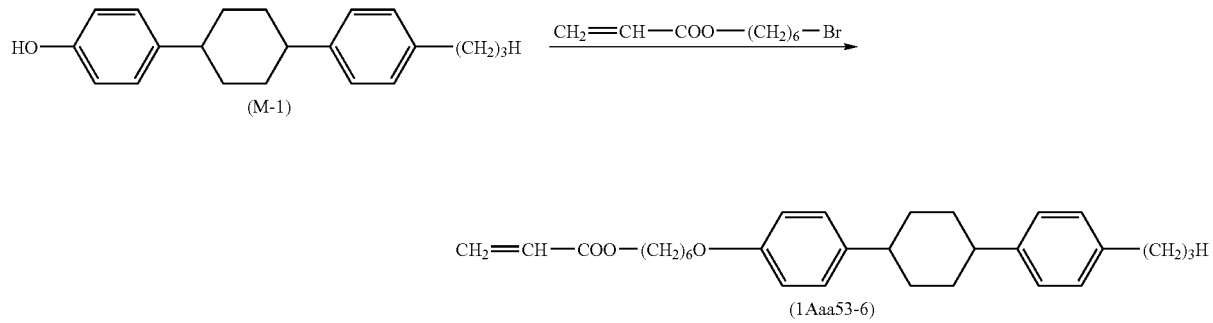

A mixture of compound (M-1) (5.00 g, 0.017 mol), a compound represented by the formula CH$_2$=CH—COO—(CH$_2$)$_6$—Br (3.37 g, 0.019 mol), potassium carbonate (4.22 g, 0.031 mol), potassium iodide (0.40 g, 0.002 mol) and dehydrated acetone (200 mL) was refluxed with heating for 24 hours. Diethyl ether (100 mL) and water (200 mL) were added, followed by liquid separation, and the resulting organic layer was recovered. The organic layer was washed with 1 M hydrochloric acid (100 mL) and then washed with a saturated sodium chloride solution (200 mL), and then the organic layer was recovered again. The organic layer was dried over anhydrous magnesium sulfate, and then anhydrous magnesium sulfate was removed by vacuum filtration. The solvent was distilled off under reduced pressure, and the obtained residue was purified by column chromatography (developing solution: dichloromethane/hexane=5/5, volume ratio) to obtain a fraction containing the aimed product. The fraction was concentrated to obtain powdery crystals. To the powdery crystals, hexane (100 mL) was added for recrystallization to obtain compound (1Aaa53-6) (5.64 g) The yield was 74%.

The compound (1Aaa53-6) had a phase transition temperature from a crystal phase to a nematic phase of 110° C. and a phase transition temperature from a nematic phase to an isotropic phase of 200° C. (extrapolation value). Further, Δn of the compound (1Aaa53-6) to laser light having a wavelength of 589 nm at 80° C. was 0.0903.

NMR spectrum of the compound (1Aaa53-6):

$^1$HNMR (400 MHz, solvent: CDCl$_3$, internal standard: TMS) δ (ppm): 0.9 (t, 3H), 1.3-1.8 (m, 18H), 2.3 (t, 2H), 2.5-2.7 (m, 2H), 3.9 (t, 2H), 4.2 (t, 2H), 5.8-6.4 (dd, 3H), 7.0-7.2 (m, 8H).

Example 3

Preparation Example for Compound (1Aaa63)

Example 3-1

Preparation Example for Compound (U-1)

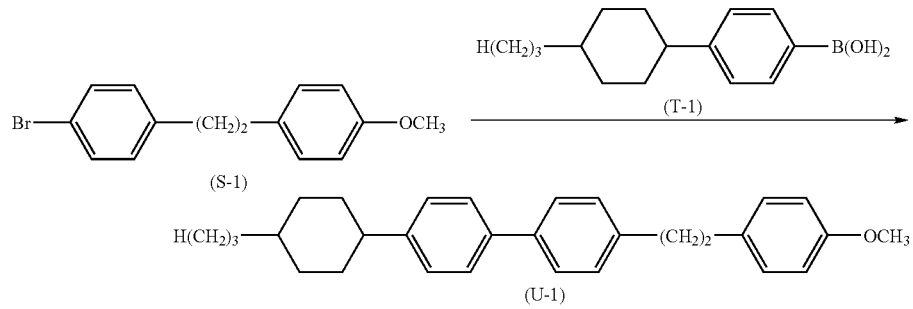

In a 1 L four-necked flask equipped with a reflux apparatus and a stirrer, compound (S-1) (18.8 g, 0.065 mol) prepared in accordance with a known method (J. Polym. Sci., Part A, 27,453 (1989)), compound (T-1) (15.8 g, 0.064 g), Pd[P(C$_6$H$_5$)$_3$]$_4$ (5.55 g), a 20% sodium carbonate aqueous solution (400 mL) and dehydrated tetrahydrofuran (600 mL) were added, followed by stirring with heating at 70° C. in a stream of nitrogen for 24 hours. After completion of the reaction, diethyl ether (200 mL) and water (200 mL) were added, and the organic layer was recovered. The organic layer was washed with 1 M hydrochloric acid (100 mL) and a saturated salt solution (100 mL), and the organic layer was recovered again. The organic layer was dried over anhydrous magnesium sulfate, and anhydrous magnesium sulfate was removed by vacuum filtration. The solvent was distilled off under reduced pressure, and the obtained residue was purified by column chromatography (developing solution: dichloromethane/hexane=5/5, volume ratio) to obtain a fraction containing the aimed product. The fraction was concentrated to obtain powdery crystals. To the powdery crystals, hexane (100 mL) was added for recrystallization to obtain compound (U-1) (17.2 g). The yield was 65%.

Example 3-2

Preparation Example for Compound (V-1)

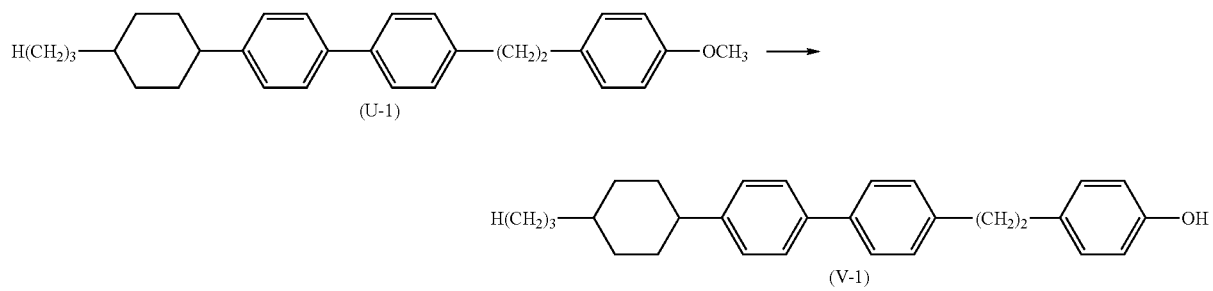

Boron tribromide (2.75 g, 0.064 mol) was dropwise added to a mixture of the compound (U-1) (10.0 g, 0.064 mol) obtained in Example 3-1 and dehydrated dichloromethane (200 mL). The dropping operation was carried out under cooling with ice so that the temperature of the reaction solution would not exceed 10° C. Stirring was continued at room temperature for 4 hours, and then water and diethyl ether were added, followed by liquid separation, and the resulting organic layer was recovered. The recovered organic layer was washed with a saturated sodium carbonate aqueous solution and dried over anhydrous magnesium sulfate. Anhydrous magnesium sulfate was removed by vacuum filtration, and the filtrate was concentrated to obtain powdery crystals. Recrystallization was carried out by using a solvent mixture (90 mL) of dichloromethane and hexane to obtain compound (V-1) (9.27 g). The yield was 96%.

Example 3-3

Preparation Example for Compound (1Aaa63)

In a 500 mL four-necked flask equipped with a reflux apparatus, a stirrer and a dropping apparatus, the compound (V-1) (8.0 g, 0.02 mol) obtained in Example 3-2, triethylamine (3.12 g, 0.03 mol) and tetrahydrofuran (200 mL) were added. In a stream of nitrogen, acrylic acid chloride (2.88 g, 0.03 mol) was dropwise added thereto under cooling with ice so that the internal temperature would not exceed 20° C. After stirring for 24 hours, a mixture of concentrated hydrochloric acid (2 mL), ice (20 g) and water (30 mL) was added, followed by liquid separation, and the resulting organic layer was recovered. Post-treatment and recrystallization were carried out in the same manner as in Example 3-1 to obtain compound (1Aaa63) (7.05 g). The yield was 78%.

The compound (1Aaa63) had a phase transition temperature from a crystal phase to a nematic phase of 200° C. and a phase transition temperature from a nematic phase to an isotropic phase of 370° C. (extrapolation value). Further, Δn of the compound (1Aaa63) to laser light having a wavelength of 589 nm at 60° C. was 0.2443 (extrapolation value).

NMR spectrum of the compound (1Aaa63):

$^1$HNMR (400 MHz, solvent: CDCl$_3$, internal standard: TMS) δ (ppm): 0.96 (t, 3H), 1.1-1.4 (m, 9H), 1.91 (m, 4H), 2.51 (m, 1H), 2.88 (t, 4H), 5.9-6.7 (m, 3H), 7.0-7.2 (dd, 4H), 7.4-7.6 (dd, 8H).

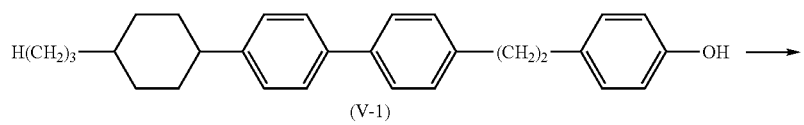

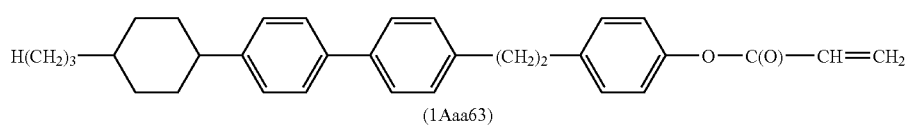

Example 4

Preparation Example for Compound (1Ba-3)

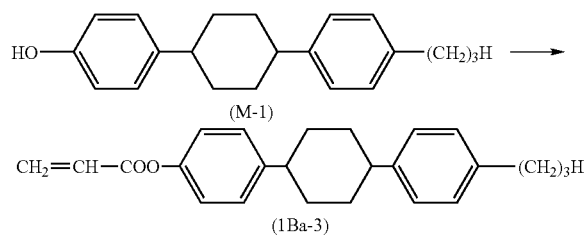

Acrylic acid chloride (1.10 g, 0.012 mol) was added to a mixture of compound (M-1) (3.0 g, 0.010 mol), tetrahydrofuran (70 mL) and triethylamine (1.27 g, 0.012 mol). The dropping operation was carried out under cooling with ice so that the temperature of the reaction solution would not exceed 20° C. After stirring for 24 hours, a mixture of concentrated hydrochloric acid (2 mL), ice (20 g) and water (30 mL) was added, followed by liquid separation, and the resulting organic layer was recovered. The organic layer was washed with a saturated sodium chloride aqueous solution (40 mL) and washed with water, and the organic layer was recovered again. The organic layer was dried over anhydrous magnesium sulfate, and anhydrous magnesium sulfate was removed by vacuum filtration. The filtrate was purified by column chromatography (developing solution: dichloromethane/hexane=5/5, volume ratio) to obtain a fraction containing the aimed product. The fraction was concentrated to obtain powdery crystals. To the powdery crystals, a solvent mixture (90 mL) of dichloromethane and hexane was added for recrystallization to obtain compound (1Ba-3) (2.7 g). The yield was 76%.

The compound (1Ba-3) had a phase transition temperature from a crystal phase to a nematic phase of 124° C. and a phase transition temperature from a nematic phase to an isotropic phase of 200° C. (extrapolation value). Further, Δn of the compound (1Ba-3) to laser light having a wavelength of 589 nm at 50° C. was 0.08 (extrapolation value).

$^1$HNMR spectrum data of the compound (1Ba-3) are shown below.

$^1$HNMR (400 MHz, solvent: CDCl$_3$, internal standard: TMS) δ (ppm): 0.9 (t, 3H), 1.4-1.8 (m, 10H), 2.5-2.7 (m, 4H), 6.0-6.6 (dd, 3H), 7.0-7.2 (s, 8H).

Example 5

Preparation Example for Compound (1Bb-3)

Example 5-1

Preparation Example for Compound (Q-1)

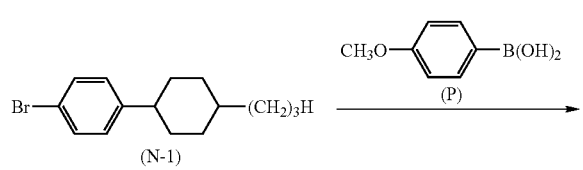

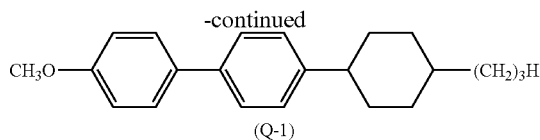

Into a 1 L four-necked flask equipped with a reflux apparatus and a stirrer, compound (N-1) (18.2 g, 0.064 mol), compound (P) (9.75 g, 0.064 mol), Pd[P(C$_6$H$_5$)$_3$]$_4$ (5.55 g, 0.0048 mol), a 20% sodium carbonate aqueous solution (400 mL) and tetrahydrofuran (640 mL) were added, followed by reaction in a stream of nitrogen at 70° C. for 24 hours. After completion of the reaction, water and diethyl ether were added, followed by liquid separation, and the resulting organic layer was recovered. The recovered organic layer was washed with a saturated sodium chloride aqueous solution (40 mL) and washed with water, and the organic layer was recovered again. The organic layer was dried over anhydrous magnesium sulfate, and anhydrous magnesium sulfate was removed by vacuum filtration. The filtrate was purified by column chromatography (developing solution: dichloromethane/hexane=5/5, volume ratio) to obtain a fraction containing the aimed product. The fraction was concentrated to obtain powdery crystals. To the powdery crystals, a solvent mixture (90 mL) of dichloromethane and hexane was added for recrystallization to obtain compound (Q-1) (17.4 g). The yield was 86%.

Example 5-2

Preparation Example for Compound (R-1)

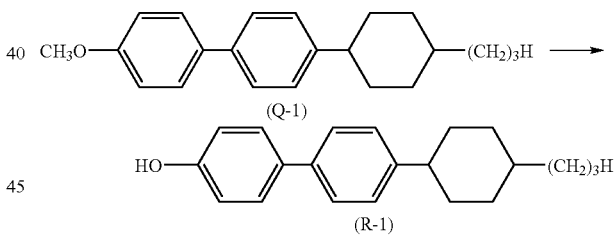

In a 500 mL four-necked flask equipped with a reflux apparatus, a stirrer and a dropping apparatus, compound (Q-1) (10 g, 0.032 mol) obtained in Example 5-1 and dichloromethane (300 mL) were added. In a stream of nitrogen, a 1 mol/L boron tribromide-dichloromethane solution (34 mL) was dropwise added thereto over a period of 30 minutes. The dropping operation was carried out under cooling with ice so that the internal temperature would not exceed 10° C. Stirring was continued at room temperature for 2 hours, and water and diethyl ether were added, followed by liquid separation, and the resulting organic layer was recovered. The recovered organic layer was washed with a saturated sodium carbonate aqueous solution and dried over anhydrous magnesium sulfate. Anhydrous magnesium sulfate was removed by vacuum filtration, and the filtrate was concentrated to obtain powdery crystals. Recrystallization was carried out by using a solvent mixture (90 mL) of dichloromethane and hexane to obtain compound (R-1) (8.93 g) The yield was 94%.

Example 5-3

Preparation Example for Compound (1Bb-3)

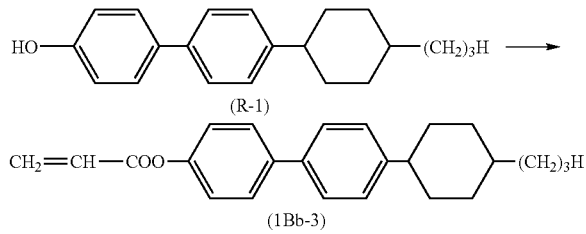

In a 500 mL four-necked flask equipped with a reflux apparatus, a stirrer and a dropping apparatus, the compound (R-1) (8.0 g, 0.027 mol) obtained in Example 5-2, triethylamine (3.40 g, 0.033 mol) and tetrahydrofuran (300 mL) were added. In a stream of nitrogen, acrylic acid chloride (2.94 g, 0.033 mol) was dropwise added thereto under cooling with ice so that the internal temperature would not exceed 20° C. After stirring for 24 hours, a mixture of concentrated hydrochloric acid (2 mL), ice (20 g) and water (30 mL) was added, followed by liquid separation, and the resulting organic layer was recovered. Post-treatment and recrystallization were carried out in the same manner as in Example 1-1 to obtain compound (1Bb-3) (8.1 g). The yield was 86%.

The compound (1Bb-3) had a phase transition temperature from a crystal phase to a nematic phase of 160° C. and a phase transition temperature from a nematic phase to an isotropic phase of 198° C. (extrapolation value). Further, Δn of the compound (1Bb-3) to laser light having a wavelength of 589 nm at 50° C. was 0.18 (extrapolation value).

$^1$HNMR spectrum data of the compound (1Bb-3) are shown below.

$^1$HNMR (400 MHz, solvent: CDCl$_3$, internal standard: TMS) δ (ppm): 0.91 (t, 3H), 1.09 (m, 2H), 1.1-1.4 (m, 5H), 1.50 (m, 2H), 1.91 (t, 4H), 2.51 (m, 1H), 5.9-6.7 (m, 3H), 7.0-7.3 (dd, 4H), 7.4-7.6 (dd, 4H).

Example 6

Preparation Example for Compound (1Bb-5)

Example 6-1

Preparation Example for Compound (Q-2)

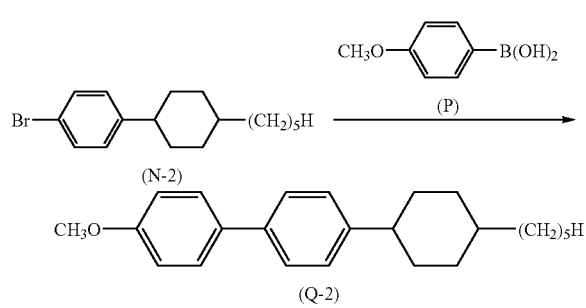

Compound (Q-2) (18.7 g) was obtained in the same manner as in Example 5-1 except that compound (N-2) (20.1 g, 0.064 mol) was used instead of the compound (N-1) (18.2 g, 0.064 mol). The yield was 87%.

Example 6-2

Preparation Example for Compound (R-2)

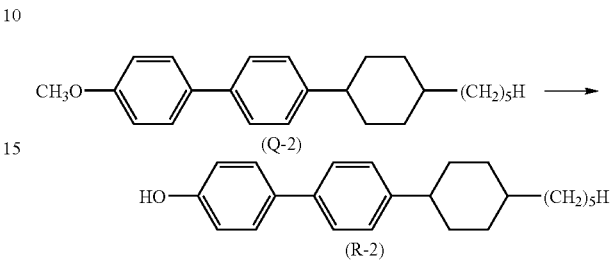

Compound (R-2) (19.7 g) was obtained in the same manner as in Example 5-2 except that the compound (Q-2) (10.9 g, 0.032 mol) prepared in Example 6-1 was used instead of the compound (Q-1) (10 g, 0.032 mol). The yield was 82%.

Example 6-3

Preparation Example for Compound (1Bb-5)

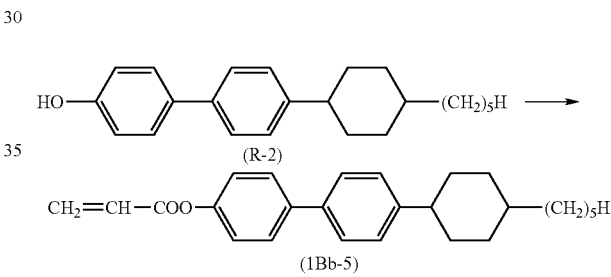

Compound (1Bb-5) (8.0 g) was obtained in the same manner as in Example 5-3 except that the compound (R-2) (8.8 g, 0.027 mol) obtained in Example 6-2 was used instead of the compound (R-1) (8.0 g, 0.027 mol). The yield was 82%.

The compound (1Bb-5) had a phase transition temperature from a crystal phase to a nematic phase of 160° C. and a phase transition temperature from a nematic phase to an isotropic phase of 198° C. (extrapolation value). Further, Δn of the compound (1Bb-5) to laser light having a wavelength of 589 nm at 50° C. was 0.18 (extrapolation value).

$^1$HNMR spectrum data of the compound (1Bb-5) are shown below.

$^1$HNMR (400 MHz, solvent: CDCl$_3$, internal standard: TMS) δ (ppm): 0.91 (t, 3H), 1.09 (m, 2H), 1.1-1.4 (m, 9H), 1.50 (m, 2H), 1.91 (t, 4H), 2.51 (m, 1H), 5.9-6.7 (m, 3H), 7.0-7.3 (dd, 4H), 7.4-7.6 (dd, 4H).

Example 7

Preparation Example (1) for Liquid Crystal Composition

The compound (1Aaa13) prepared in Example 1 and the following compound (3Bc3) were mixed in a ratio of 1:1 (molar ratio) to prepare a liquid crystal composition A. The liquid crystal composition A was crystallized at 43.4° C.

Further, the phase transition temperature from a nematic phase to an isotropic phase was at least 125° C. Then, a photopolymerization initiator was added to the liquid crystal composition A in an amount of 0.5 mass % based on the liquid crystal composition A to obtain a liquid crystal composition A1.

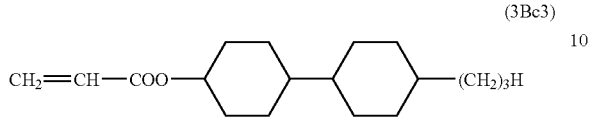
(3Bc3)

Example 8

Preparation Example (2) for Liquid Crystal Composition B

The compound (1Aaa53-6) obtained in Example 2 and the compound (1Ba-3) obtained in Example 4 were mixed in a ratio of 1:1 (molar ratio) to obtain a liquid crystal composition B. The liquid crystal composition B showed a nematic phase in a range of from 59.0° C. to 116.6° C. Then, a photopolymerization initiator was added to the liquid crystal composition B in an amount of 0.5 mass % based on the liquid crystal composition B to obtain a liquid crystal composition B1.

Example 9

Preparation Example (3) for Liquid Crystal Composition

The compound (1Aaa53-6) obtained in Example 3, the following compound (3Bc3) and the following compound (3Bc5) were mixed in a ratio of 2:1:1 (molar ratio) to obtain a liquid crystal composition C. The liquid crystal composition C showed a nematic phase in a range of from 50.0° C. to 120.6° C. Then, a photopolymerization initiator was added to the liquid crystal composition C in an amount of 0.5 mass % based on the liquid crystal composition C to obtain a liquid crystal composition C1.

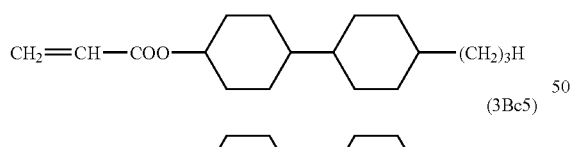
(3Bc3)
(3Bc5)

Example 10

Preparation Example (4) for Liquid Crystal Composition

The compound (1Ba-3) obtained in Example 4 and the above compound (3Bc5) were mixed in a ratio of 1:1 (molar ratio) to obtain a liquid crystal composition D. The liquid crystal composition D showed a nematic phase in a range of from 45.4° C. to 92.1° C. Then, a photopolymerization initiator was added to the liquid crystal composition D in an amount of 0.5 mass % based on the liquid crystal composition D to obtain a liquid crystal composition D1.

Example 11

Preparation Example (5) for Liquid Crystal Composition

The compound (1Ba-3) obtained in Example 4 and the following compound (3Bd-3) were mixed in a ratio of 1:1 (molar ratio) to obtain a liquid crystal composition E. The liquid crystal composition E showed a nematic phase in a range of from 43.7° C. to 90.8° C. Then, a photopolymerization initiator was added to the liquid crystal composition E in an amount of 0.5 mass % based on the liquid crystal composition E to obtain a liquid crystal composition E1.

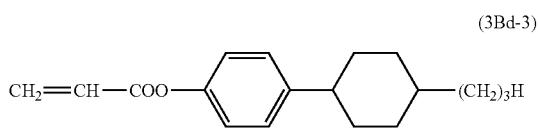
(3Bd-3)

Example 12

Preparation Example (6) for Liquid Crystal Composition

The compound (1Bb-3) obtained in Example 5, the compound (1Bb-5) obtained in Example 6, the above compound (3Bc3) and the above compound (3Bc5) were mixed in a molar ratio of 1:1:1:1 to obtain a liquid crystal composition F. The liquid crystal composition F showed a nematic phase at a temperature of at least 77° C. Further, the phase transition temperature from a nematic phase to an isotropic phase was at least 124° C. Then, a photopolymerization initiator was added to the liquid crystal composition F in amounts of 0.5 mass % and 1.0 mass % to such liquid crystal compositions F to obtain a liquid crystal composition F1 and a liquid crystal composition F2, respectively.

Example 13

Preparation Example (7) for Liquid Crystal Composition

A liquid crystal composition G was obtained by using the same compounds as in Example 12 except that the mixing ratio was changed. The mixing ratio of the compound (1Bb-3), the compound (1Bb-5), the compound (3Bc3) and the compound (3Bc5) was 7:7:18:18 (molar ratio).

The liquid crystal composition G showed a nematic phase at a temperature of at least 30° C. Further, the phase transition temperature from a nematic phase to an isotropic phase was at least 124° C.

Then, a photopolymerization initiator was added to the liquid crystal composition G in an amount of 0.5 mass % based on the liquid crystal composition G to obtain a liquid crystal composition G1.

Example 14

Example for Preparation and Evaluation of Optical Element A

A glass substrate of 5 cm×5 cm×0.5 mm in thickness was coated with a polyimide solution by spin-coating and dried, and then subjected to rubbing treatment in a predetermined direction with a nylon cloth to prepare a support. Two such supports were bonded to each other by use of an adhesive agent so that the surfaces which were treated for alignment faced each other, whereby a cell was prepared. Glass beads having a diameter of 4 μm were added to the adhesive agent so that the space between the supports was adjusted to 4 μm.

Then, the liquid crystal composition A1 obtained in Example 7 was injected into the cell at 100° C. Photopolymerization was conducted under irradiation with ultraviolet light with an intensity of 80 mW/cm² at 80° C. so that the total amount of light was 5,300 mJ/cm² to obtain an optical element A. The optical element A was horizontally aligned in the rubbing direction. An of the optical element A to laser light having a wavelength of 589 nm was 0.046. Further, the optical element A was transparent in the visible range, and no scattering was observed.

Further, the optical element A was irradiated with a Kr laser (multimode at wavelengths of 407 nm and 413 nm) to carry out an accelerated exposure test with blue laser light. The irradiation conditions were such that the temperature was 25° C. and the total exposure energy was 15 W×hour/mm². The decrease in Δn after the test relative to Δn before the accelerated exposure test was less than 1%, and the decrease in the transmittance to laser light having a wavelength of 405 nm was less than 1%, whereby the optical element A was confirmed to be excellent in durability against blue laser light.

Example 15

Example for Preparation and Evaluation of Optical Element B

An optical element B was obtained in the same manner as in Example 14 except that the liquid crystal composition B1 obtained in Example 8 was used instead of the liquid crystal composition A1. The optical element B was horizontally aligned in the rubbing direction. Δn of the optical element B to laser light having a wavelength of 589 nm was 0.119. Further, the optical element B was transparent in the visible range, and no scattering was observed.

The optical element B was subjected to an accelerated exposure test with blue laser light in the same manner as in Example 14. The decrease in Δn after the test relative to Δn before the accelerated exposure test was less than 1%, and the decrease in the transmittance to laser light having a wavelength of 405 nm was less than 1%, whereby the optical element B was confirmed to be excellent in durability against blue laser light.

Example 16

Example for Preparation and Evaluation of Optical Element C

An optical element C was obtained in the same manner as in Example 14 except that the liquid crystal composition C1 obtained in Example 9 was used instead of the liquid crystal composition A1. The optical element C was horizontally aligned in the rubbing direction. Δn of the optical element C to laser light having a wavelength of 589 nm was 0.068. Further, the optical element C was transparent in the visible range, and no scattering was observed.

The optical element C was subjected to an accelerated exposure test with blue laser light in the same manner as in Example 14. The decrease in Δn after the test relative to Δn before the accelerated exposure test was less than 1%, and the decrease in the transmittance to laser light having a wavelength of 405 nm was less than 1%, whereby the optical element C was confirmed to be excellent in durability against blue laser light.

Example 17

Example for Preparation and Evaluation of Optical Element D

An optical element D was obtained in the same manner as in Example 14 except that the liquid crystal composition D1 obtained in Example 10 was used instead of the liquid crystal composition A1. The optical element D was horizontally aligned in the rubbing direction. Δn of the optical element D to laser light having a wavelength of 589 nm was 0.055. Further, the optical element D was transparent in the visible range, and no scattering was observed.

The optical element D was subjected to an accelerated exposure test with blue laser light in the same manner as in Example 14. The decrease in Δn after the test relative to Δn before the accelerated exposure test was less than 1%, and the decrease in the transmittance to laser light having a wavelength of 405 nm was less than 1%, whereby the optical element D was confirmed to be excellent in durability against blue laser light.

Example 18

Example for Preparation and Evaluation of Optical Element E

An optical element E was obtained in the same manner as in Example 14 except that the liquid crystal composition E1 obtained in Example 11 was used instead of the liquid crystal composition A1. The optical element E was horizontally aligned in the rubbing direction of the substrate. Δn to laser light having a wavelength of 589 nm was 0.058. Further, the optical element E was transparent in the visible range, and no scattering was observed.

The optical element E was subjected to an accelerated exposure test with blue laser light in the same manner as in Example 14. The decrease in Δn after the test relative to Δn before the accelerated exposure test was less than 1%, and the decrease in the transmittance to laser light having a wavelength of 405 nm was 1.7%, whereby the optical element E was confirmed to be excellent in durability against blue laser light.

Example 19

Preparation Example (1) for Optical Element

Example 19-1a

Preparation Example for Optical Element F1

An optical element F1 was obtained in the same manner as in Example 14 except that the liquid crystal composition F1 prepared in Example 12 was used instead of the liquid crystal composition A1, the injection temperature was 110° C., and the polymerization temperature was 90° C. The optical element F1 was horizontally aligned in the rubbing direction of the substrate. The optical element F1 was transparent in the visible range, and no scattering was observed. Further, Δn to laser light having a wavelength of 589 nm was 0.064.

Example 19-1b

Example for Evaluation of Optical Element F1

The optical element F1 was subjected to an accelerated exposure test with blue laser light in the same manner as in Example 14. The decrease in Δn after the test relative to Δn before the accelerated exposure test was less than 1%, and the decrease in the transmittance to laser light having a wavelength of 405 nm was less than 1%, whereby the optical element F1 was confirmed to be excellent in durability against blue laser light.

Example 19-2

Preparation Example for Polarizing Hologram

A glass substrate having a rectangular lattice with a pitch of 9 μm and a depth of 3 μm is coated with a polyimide as an aligning agent by spin-coating and was subjected to thermal treatment. It was then subjected to rubbing treatment with a nylon cloth in a direction parallel with the lattice to prepare a support. Two such supports were bonded to each other by use of an adhesive agent so that the surfaces treated for alignment faced each other, whereby a cell was prepared. When preparing the cell, such glass substrates were adjusted so that the alignment directions were in parallel.

The liquid crystal composition F2 obtained in Example 12 was injected into such a cell at 100° C. Polymerization reaction was then conducted under irradiation with ultraviolet light with an intensity of 40 mW/cm² at 90° C. for 3 minutes to obtain an optical element F2. On one side of the optical element F2, a quarter wavelength plate was laminated to prepare a polarizing hologram beam splitter. The polarizing hologram beam splitter was mounted on an optical head device, and it was possible to obtain 27% of a utilization efficiency of light against laser light having a wavelength of 650 nm.

Example 20

Preparation Example for Optical Element

Example 20-1

Preparation Example for Optical Element G

An optical element G was obtained in the same manner as in Example 14 except that the liquid crystal composition G1 obtained in Example 13 was used instead of the liquid crystal composition A1. The optical element G was horizontally aligned in the rubbing direction of the substrate. The optical element G was transparent in the visible range, and no scattering was observed. Further, Δn to laser light having a wavelength of 589 nm was 0.039.

Example 20-2

Example for Evaluation of Optical Element G

An accelerated exposure test with blue laser light was carried out in the same manner as in Example 14 on the optical element G. The decrease in Δn after the test relative to Δn before the accelerated exposure test was less than 1%, and the decrease in transmittance to laser light having a wavelength of 405 nm was less than 1%, whereby the optical element G was confirmed to be excellent in durability against blue laser light.

Example 21

Example 21-1

Preparation Example (8) for Liquid Crystal Composition

The following compounds (4a), (4b), (4c) and (4d) were mixed in a ratio of 1:1:1:1 (mass ratio) to prepare a liquid crystal composition H. Then, to the liquid crystal composition H, a photopolymerization initiator was added in an amount of 0.5 mass % based on the liquid crystal composition H to obtain a liquid crystal composition H1.

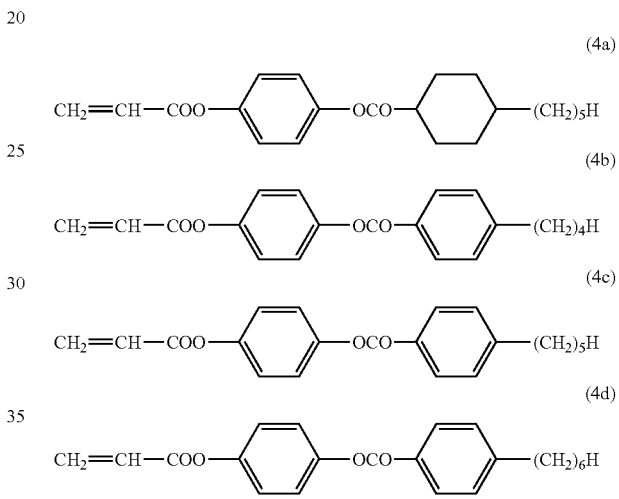

Example 21-2

Example for Preparation and Evaluation of Optical Element H

An optical element H was obtained in the same manner as in Example 14 except that the liquid crystal composition H1 obtained in Example 21-1 was used instead of the liquid crystal composition A1. Δn to laser light having a wavelength of 589 nm was 0.046. Further, the optical element H was transparent in the visible region, and no scattering was confirmed.

An accelerated exposure test with blue laser light was carried out in the same manner as in Example 14 on the optical element H. The decrease in Δn after the test relative to Δn before the accelerated exposure test was 30%. Further, the transmittance to laser light having a wavelength of 405 nm after the test decreased to 60% of the transmittance before the test.

INDUSTRIAL APPLICABILITY

The novel compound of the present invention is a compound which satisfies characteristics required for an optical anisotropic material and which is excellent in durability against blue laser light. An optical anisotropic material obtained by polymerizing a liquid crystal composition containing the novel compound of the present invention and an optical element are excellent in durability against blue laser light, whereby they are useful as a material for a diffraction element, a phase plate, etc. which modulate blue laser light.

The entire disclosures of Japanese Patent Application No. 2004-185090 filed on Jun. 23, 2004, Japanese Patent Application No. 2004-187788 filed on Jun. 25, 2004 and Japanese Patent Application No. 2004-187795 filed on Jun. 25, 2004 including specifications, claims and summaries are incorporated herein by reference in their entireties.

What is claimed is:

1. A compound represented by the following formulae (1'), (2) or (3):

$$CH_2=CR^1-COO-L-E^1-E^2-E^3-R^2 \quad (1')$$

provided that the symbols in the formula (1') have the following meanings:
$R^1$ is a hydrogen atom or a methyl group;
$R^2$ is a $C_{1-8}$ alkyl group;
L is -Cy-COO— (wherein Cy is a trans-1,4-cyclohexylene group), or -Cy-OCO—; and
$E^1$, $E^2$, $E^3$ are each independently a 1,4-phenylene group or a trans-1,4cyclohexylene group (provided that at least one of $E^1$, $E^2$ and $E^3$ is a trans-1,4-cyclohexylene group, and in a case where L is -Cy-COO—, $E^1$ is a trans-1,4-cyclohexylene group), provided that the above 1,4-phenylene group and trans-1,4-cyclohexylene group may be such that a hydrogen atom bonded to a carbon atom in each group may be substituted by a fluorine atom, a chlorine atom or a methyl group;

$$CH_2=CR^1-COO-(CH_2)_p O-Ph-Cy-Ph-R^2 \quad (2)$$

provided that the symbols in the formula (2) have the following meanings:
$R^1$ is a hydrogen atom or a methyl group;
$R^2$ is a $C_{1-8}$ alkyl group;
Ph is a 1,4-phenylene group;
Cy is a trans-1,4-cyclohexlene group; and
p is an integer of from 2 to 8; and $$CH_2=CR^1-COO-Ph-Cy-Ph-R^2 \quad (3)$$

provided that the symbols in the formula (3) have the following meanings:
$R^1$ is a hydrogen atom or a methyl group;
$R^2$ is a $C_{1-8}$ alkyl group;
Ph is a 1,4-phenylene group; and
Cy is a trans-1,4-cyclohexlene group.

2. A liquid crystal composition, comprising:
(i) at least two compounds selected from the compounds as defined in claim 1 or (ii) at least one compound as defined in claim 1 and at least one polymerizable liquid crystal other than the compound as defined in claim 1.

3. An optical anisotropic material obtained by polymerizing the liquid crystal composition as defined in claim 2 in a state where the liquid crystal composition shows a liquid crystal phase and in a state where the liquid crystal is aligned.

4. An optical element obtained by sandwiching the liquid crystal composition as defined in claim 2 in a pair of supports, and polymerizing the liquid crystal composition in a state where it shows a liquid crystal phase and in a state where the liquid crystal is aligned.

5. A diffraction element, which comprises the optical element as defined in claim 4.

6. A phase plate, which comprises the optical element as defined in claim 4.

7. A polymerizable liquid crystal composition, comprising;
at least 75 mass % of a polymerizable liquid crystal, wherein the polymerizable liquid crystal composition comprises at least 5 mass % of a compound represented by the following formula (1) based on the entire polymerizable liquid crystal; and wherein the polymerizable liquid crystal composition comprises at least 50 mass % of a compound represented by the following formula (1) and at least one compound represented by the following formulae (3A), (3B) and (3C) based on the entire polymerizable liquid crystal, $$CH_2=CR^1-COO-(L)_k-E^1-E^2-E^3-(E^4)_m-(E^5)_n-R^2 \quad (1)$$

$$CH_2=CR^3-COO-Ph-OCO-Cy-Z^2-R^4 \quad (3A)$$

$$CH_2=CR^5-COO-Z^3-Z^4-R^6 \quad (3B)$$

$$CH_2=CR^7-COO-(CH_2)_v-O-Ph-Z^5-R^8 \quad (3C)$$

provided that the symbols in the formulae have independently the following meanings;
$R^1$, $R^3$, $R^5$ and $R^7$ are each independently a hydrogen atom or a methyl group;
$R^3$, $R^4$, $R^6$ and $R^8$ are each independently a $C_{1-8}$ alkyl group;
L is $-(CH_2)_p O-$, $-(CH_2)_q-$, -Cy-COO— (Cy is a trans-1,4-cyclohexylene group), -Cy-OCO—, $-E^6-(CH_2)_2-$, $-E^7-CH_2 O-$ or $-E^8-O-$ (wherein each of p and q which are independent of each other, is an integer of from 2 to 8);
$E^1$, $E^2$, $E^3$, $E^4$, $E^5$, $E^6$, $E^7$, $E^8$, $Z^2$, $Z^3$, $Z^4$ and $Z^5$ are each independently a 1,4-phenylene group or a trans-1,4-cyclohexylene group (provided that at least one of $E^1$, $E^2$ and $E^3$ is a trans-1,4-cyclohexylene group, and in case where L is -Cy-OCO—, $E^1$ is a trans-1,4-cyclohexylene group), provided that the above 1,4-phenylene group and trans-1,4-cyclohexylene group may be such that a hydrogen atom bonded to a carbon atom in each group may be substituted by a fluorine atom, a chlorine atom or a methyl group; and
k, m, n are each independently 0 or 1, provided that when k is 1 and L is -Cy-COO—, -Cy-OCO—, $-E^6-(CH_2)_2-$, $-E^7-CH_2 O-$ or $-E^8-O-$, at least one of m and n is 0;
Ph is a 1,4-phenylene group; and
v is an integer of from 1 to 8.

8. The polymerizable liquid crystal composition according to claim 7, wherein the compound represented by said formula (1) is a compound represented by the following formula (1B):

$$CH_2=CR^1-COO-E^1-E^2-E^3-R^2 \quad (1B)$$

provided that the symbols in the formulae have the same meanings as above.

9. The polymerizable liquid crystal composition according to claim 8, wherein the compound represented by said formula (1B) is a compound represented by the following formula (1Ba) or (1Bb):

$$CH_2=CR^1-COO-Ph-Cy-Ph-R^2 \quad (1Ba)$$

$$CH_2=CR^1-COO-Ph-Ph-Cy-R^2 \quad (1Bb)$$

provided that the symbols in the formulae have the same meanings as above.

10. An optical anisotropic material obtained by polymerizing the liquid crystal composition as defined in claim 7 in a state where the liquid crystal composition shows a liquid crystal phase and in a state where the liquid crystal is aligned.

11. An optical element obtained by sandwiching the liquid crystal composition as defined in claim 7 in a pair of supports, and polymerizing the liquid crystal composition in a state where it shows a liquid crystal phase and in a state where the liquid crystal is aligned.

12. A diffraction element, which comprises the optical element as defined in claim 11.

13. A phase plate, which comprises the optical element as defined in claim 7.

* * * * *